United States Patent [19]
Schultes

[11] Patent Number: 5,885,694
[45] Date of Patent: Mar. 23, 1999

[54] PACKING ELEMENT FOR MASS TRANSFER HEAT TRANSFER COLUMNS

[75] Inventor: Michael Schultes, Ludwigshafen am Rhein, Germany

[73] Assignee: Raschig AG, Ludwigshafen am Rhein, Germany

[21] Appl. No.: 702,278

[22] Filed: Aug. 23, 1996

[30] Foreign Application Priority Data

Aug. 24, 1995 [DE] Germany .......................... 195 31 151.5
Oct. 10, 1995 [DE] Germany .......................... 195 37 690.0

[51] Int. Cl.[6] ................................ B32B 3/28; B01D 47/00
[52] U.S. Cl. ........................ 428/174; 428/182; 428/184; 428/212; 261/112.2; 261/DIG. 72
[58] Field of Search ..................... 428/174, 182, 428/184, 114, 192, 212; 261/112.2, DIG. 72

[56] References Cited

U.S. PATENT DOCUMENTS

| | | | |
|---|---|---|---|
| 4,344,899 | 8/1982 | Monjoie | 428/182 |
| 4,800,047 | 1/1989 | Monjoie | 428/177 |
| 4,942,889 | 7/1990 | Grollimund | 428/188 |
| 5,667,875 | 9/1997 | Usui | 428/182 |

*Primary Examiner*—Donald Loney
*Attorney, Agent, or Firm*—Dvorak & Orum

[57] ABSTRACT

A packing element for mass transfer column or towers and/or heat transfer columns or towers through which a gas and/or a liquid flows, is provided herein. The packing element possesses a plurality of exchange surfaces. The exchange surfaces of the packing element are formed by the surfaces of half-wave-shaped strips or wave-shaped strips. The packing element also possesses at least one first group of strips containing at least one half-wave-shaped strip or wave-shaped strip having a first periodic length, and at least one second group of strips adjoining thereto and containing at least one half-wave-shaped or wave-shaped strip having a second periodic length. Preferably, at least one outer side of the packing element is formed as a boundary element joining at least some of the strips of a group of strips.

30 Claims, 2 Drawing Sheets

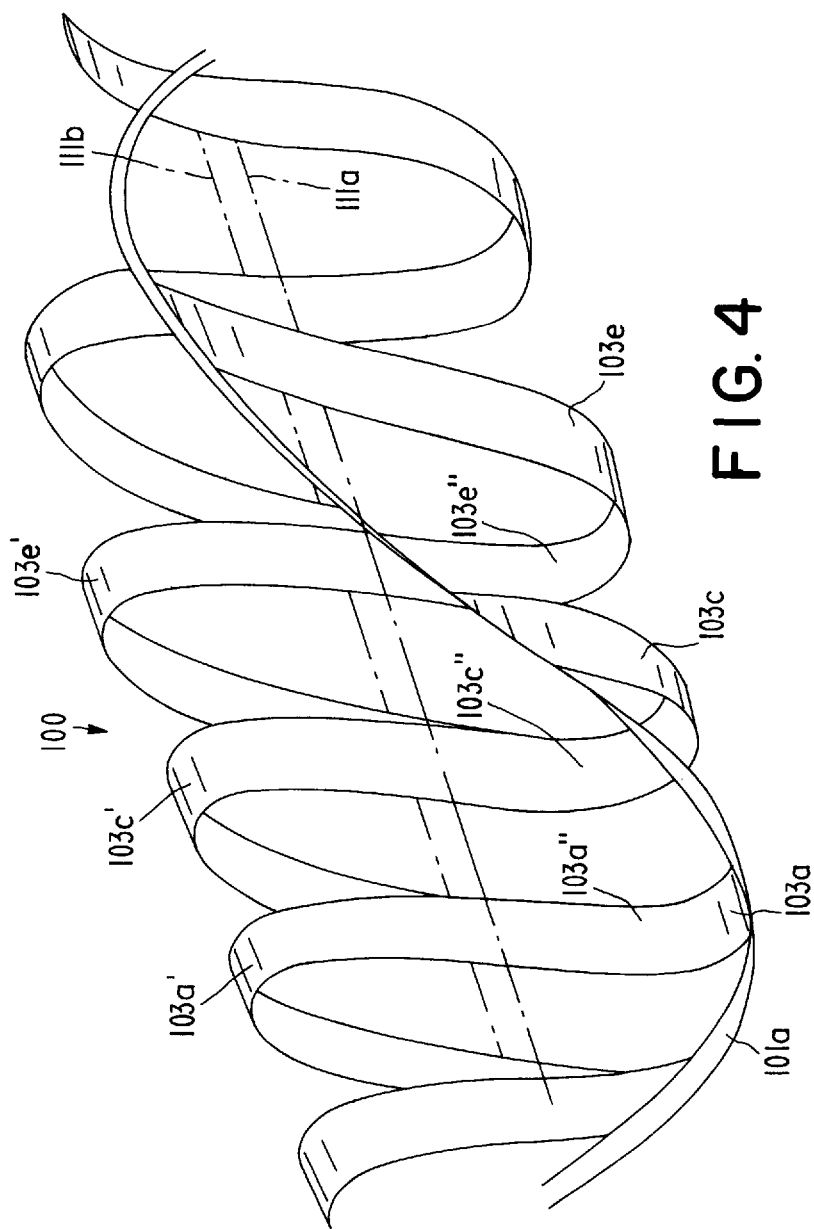

PACKING ELEMENT FOR MASS TRANSFER HEAT TRANSFER COLUMNS

BACKGROUND OF THE INVENTION (i) Field of the Invention

The invention relates to a packing element for mass transfer or heat transfer columns or towers through which a gas and/or a liquid flows.

(ii) Description of the Prior Art

Such packing elements are known and are used in systematically structured packings in mass transfer and/or heat transfer columns, especially in such columns operated according to the counter-current principle, e.g., distillation, rectification or absorption towers. In such applications, the packing elements consist of lamellae arranged vertically in the direction of flow, the packing element possessing undulations or folds oriented at an angle to the direction of flow. In the packed state, the lamellae of adjacent packing elements intersect and are in contact with each other.

EP 0 158 917 describes a packing element which possesses narrow slits, regularly arranged in each case on the flanks of the undulations or folds, while the edges of the peaks and valleys of the undulations and folds are left unslit. The purpose of this design is to achieve a uniform, and thus optimum, distribution of the counter-current flowing media, and thus to obtain an optimum exchange of media. These known packing elements are effective and create little loss in pressure. However, they possess the disadvantage that this type of packing element, with its regularly arranged slits, is relatively expensive to manufacture.

EP 0 130 745 describes a packing element that can be manufactured from expanded material, which is expanded after the slits have been cut in it. However, such slits then open up disadvantageously in a non-uniform manner. When undulations and folds are subsequently formed in the packing elements, some of the slits are positioned on the peaks or valleys of the undulations or folds, which again results in further irregular opening of the slits. This disadvantageously results in non-uniform distribution of the gas and/or liquid flows. Instead, the flows are arbitrarily distributed and locally different pressure losses occur. In addition, the geometry of the exchange surfaces formed by the surfaces of the packing elements undergoes continual change.

SUMMARY OF THE INVENTION (i) Aims of the Invention

An object of the invention is to provide an improved such packing element which provides optimum distribution of the gas and/or liquid flow, but which can be produced using less expensive manufacturing methods.

(ii) Statements of Invention

This invention provides a packing element for mass and/or heat transfer columns or towers through which a gas and/or a liquid flows, the packing element possessing a plurality of exchange surfaces. The exchange surfaces of the packing element are formed by the surfaces of half-wave-shaped strips or wave-shaped strips. The packing element possesses at least one first group of strips containing at least one half-wave-shaped strip or wave-shaped strip having a first periodic length, and at least one second group of strips adjoining thereto and containing at least one half-wave-shaped or wave-shaped strip having a second periodic length.

The present invention also provides a packing element for mass and/or heat transfer columns or towers through which a gas and/or a liquid flows, the packing element possessing a plurality of exchange surfaces. The exchange surfaces of the packing element are formed by the surfaces of half-wave-shaped strips or wave-shaped strips. The packing element possesses at least a first group of strips containing at least one half-wave-shaped strip or wave-shaped strip having a first periodic length, and at least one second group of strips adjoining thereto and containing at least one half-wave-shaped or wave-shaped strip having a second periodic length. At least one outer side of the packing element is formed as a boundary element joining at least some of the strips of a group of strips.

The present invention also provides a systematically constructed packing for a mass transfer column or heat transfer column, the packing comprising a plurality of the abovedescribed packing elements which have been appropriately lined up 111b joined mechanically.

(iii) Other Features of the Invention

By one feature of the invention, both outer sides of the packing element are formed as a boundary element joining at least some of the strips of a group of strips.

By another feature of the invention, both outer sides of the packing element are formed as a boundary element joining the strips of a group of strips.

By yet another feature of the invention, the first periodic length of a selected first strip in the first group of strips, in which that selected first strip adjoins the second group of strips, and the second periodic length of a selected second strip in the second group of strips, in which that selected second strip adjoins the first group of strips, are matched to each other in such a way that two adjoining strips are in contact with each other at at least one point, in such a way that liquid can pass from one of these strips to the other of these strips.

By a subsidiary feature of such feature of the invention, the packing element possesses at least one third group of strips containing at least one half-wave-shaped strip or wave-shaped strip having a third periodic length; and the third periodic length of a selected third strip in the third group of strips, in which that selected third strip adjoins the second group of strips, and the second periodic length of the selected second strip in the second group of strips, in which that selected second strip adjoins the third group of strips, are matched to each other in such a way that both adjoining strips are in contact with each other at at least one point.

By another subsidiary feature of such feature of the invention, all strips in at least one group of strips of the packing element possess substantially the same periodic length, namely the first periodic length is equal to the second periodic length.

By yet another subsidiary feature of such feature of the invention, all strips in more than one group of strips of the packing element possess substantially the same periodic length, namely the first periodic length is equal to the second periodic length and is also equal to the third periodic length.

By another feature of this invention, the first periodic length of at least one strip in the first group of strips is substantially equal to the second periodic length of a strip in the second group of strips.

By yet another feature of the invention, the first periodic length of at least one strip in the first group of strips is substantially equal to the third periodic length of a strip in the third group of strips.

By still another feature of the invention, the second group of strips is smaller than, or equal to, the first periodic length of the strips of the first group of strips.

By one subsidiary feature of such feature of the invention, the first periodic length of the strips of the first group of strips is a multiple of the second periodic length of the strips of the second group of strips, preferably that multiple is an even-numbered multiple.

By a still further feature of the invention, two adjacent strips of the packing element are mechanically connected at their point of contact.

By one subsidiary feature of such feature of the invention, at least two adjacent strips of the group of strips of the packing element form at least one continuous connection for the liquid to be distributed, preferably at least one of the continuous connections is broadened by means of a web element; and more preferably, at least one of the continuous connections extends from a first outer side of the packing element to a second outer side of the packing element which is opposite the outer side of the packing element.

By a still further feature of the invention, at least two half-waves of two strips of at least one group of strips of the packing element are arranged in opposite phase to each other.

By still a further feature of the invention, at least two adjacent strips in two adjacent groups of strips are arranged in opposite phase.

By another subsidiary feature of such feature of the invention, wherein at least one half-wave of a strip is arranged in opposite phase to a half-wave of an adjacent strip.

By yet another subsidiary feature of such feature of the invention, one upper half-wave or one lower half-wave of a strip is arranged in opposite phase to the lower half-wave or the upper half-wave, respectively, of an adjoining strip.

By still a further feature of the invention, at least one group of strips of the packing element is arranged at an oblique angle to the outer sides of the packing element; preferably the oblique angle is about 45°.

By another feature of the invention, at least two adjacent strips of the packing element possess substantially the same half-wave shape or wave shape; or at least two adjacent strips of the packing element have a different half-wave shape or wave shape.

By another feature of the invention, the half-waves or waves of at least two adjacent strips of the packing element possess substantially the same amplitude; or the half-waves or waves of at least two adjacent strips in the packing element possess a different amplitude.

By yet another feature of the invention, the packing element possesses a sine wave-shaped structure.

By still another feature of the invention, the packing element is manufactured from metal, e.g., sheet metal, or from ceramic or from synthetic plastic material.

(iv) Generalized Description of the Invention

The present invention thus enables the manufacture, in a particularly advantageous manner, of a packing element that provides highly uniform distribution of the liquid over the individual strips, i.e., over the exchange surfaces of the packing element used in systematically structured packings. On the one hand, the half-wave-shaped or wave-shaped structure of the strips, of which the packing element is formed, enables the droplets of liquid to be easily distributed over these strips. On the other hand, the half-wave-shaped or wave-shaped structure of the individual strips of the packing element for systematically structured packings further possesses the advantage that a packing made up of such packing elements possesses a particularly open structure, which results in only a low drop in pressure in the column or tower.

In an advantageous embodiment of the invention, the periodic length of a strip in the first group of strips, (which strip adjoins the second group of strips,) and the periodic length of a strip in the second group of strips, (which strip adjoins the first group of strips), are matched to each other in such a way that both adjacent strips are in contact with each other at at least one point, so that the transfer of liquid from one strip to the other can be achieved. The advantage of this embodiment is that, by this means, liquid can pass very simply from one strip to the adjacent strip.

In a further advantageous embodiment of the invention, at least one of the groups of strips of the packing element possesses at least two strips, and the strips in this group of strips are in contact with each other at at least one point. This embodiment has the advantage that it permits liquid impinging on the packing element to be distributed in a particularly simple manner over the strips belonging to this group of strips.

According to a further advantageous embodiment of the invention, all the wave-shaped strips in a group of strips possess the same periodic length, and adjacent strips are preferably arranged in opposite phase to each other. This embodiment achieves a particularly open structure in the packing structure, which is made up of packing elements, especially so when adjacent strips are arranged in opposite phase to each other, so that this packing element is ideally suited for use in packing columns or towers because it possesses an extremely low flow resistance.

According to another advantageous embodiment of the invention, the periodic length of at least one of the strips in the second group of strips is smaller than the periodic length of the strips in the second group of strips. The advantage of such an embodiment is that several contact points are created in an advantageous manner between the edge strips of the first and second group of strips, so that the liquid present on the exchange surfaces of each individual strip can pass more easily from the first to the second group of strips.

According to a further advantageous embodiment of the invention, the periodic length of the strips in the first group of strips is a multiple, especially an even-numbered multiple, of the periodic length of the strips in the second group of strips. The advantageous outcome of this embodiment is that regularly spaced connections are formed and extend across a segment of the packing element. Such segment is formed by these strips, thus guaranteeing particularly good distribution of the liquid over all the strips that make up this segment of the packing element, which is used to produce systematically structured packings.

BRIEF DESCRIPTION OF THE DRAWINGS

In the accompanying drawings,

FIG. 4 is a partial perspective view of the embodiment of the invention shown in FIG. 1.

Figure 1:
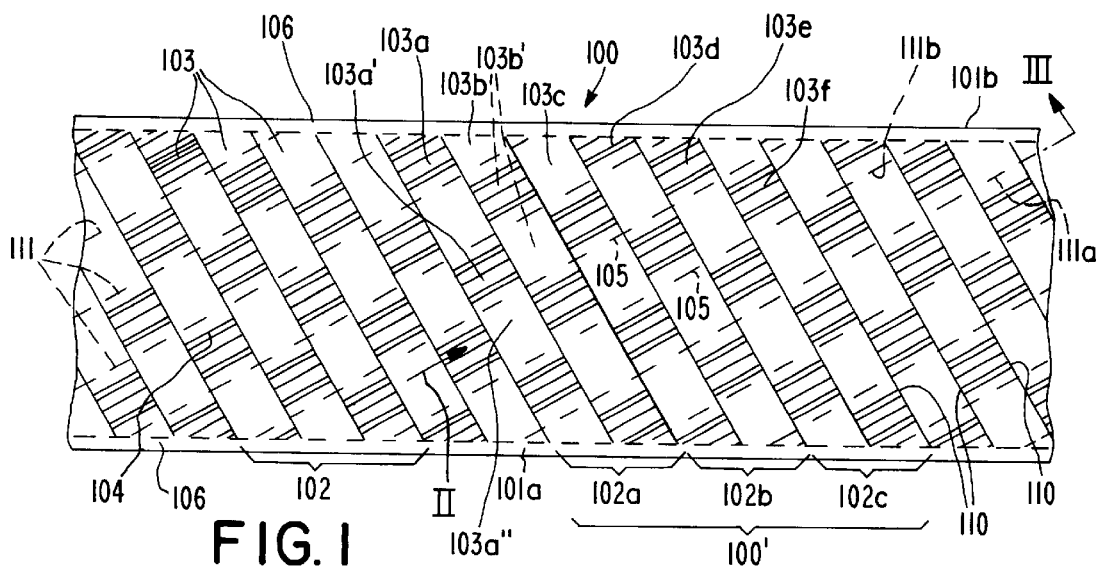
FIG. 1 is a top view of an embodiment of a packing element.

DESCRIPTION OF THE PREFERRED EMBODIMENTS (i) Description of FIGS. 1 to 4

The embodiment shown in FIGS. 1 to 4 of a packing element for use in systematically structured packings, and generally designated here by the reference number 100, preferably possesses a substantially rectangular contour, bordered by two longitudinal edges 101a and 101b as well as two transverse edges (not shown). As can best be seen in FIG. 4, the longitudinal edges 101a, 101b of the packing element 100 are wave-shaped, so that overall the packing element 100 has a wave-shaped configuration.

The packing element 100 is constituted by a plurality of groups of strips 102 containing strips 103, which are oriented at an angle to the longitudinal edges 101a, 101b, which are formed as web sections. This angled configuration can be seen in particular from FIG. 1, where the preferred configuration is shown, in which the groups of strips 102, and thus the strips 103 of the groups of strips 102, run at an angle of about 45° to the longitudinal edges 101a, 101b of the packing element 100. However, it should be mentioned at this point that, while the arrangement of the groups of strips 102 at an angle of about 45° is preferable because of the advantages which are obtained when the several packing elements 100 are assembled together to form a systematically structured column packing, it is however also entirely possible to arrange the groups of strips 102 and/or individual strips 103 at an angle other than about 45° to the longitudinal edges 101a, 101b. It is also conceivable that, in certain applications, the groups of strips 102 and/or the strips 103 in these groups of strips 102 can run orthogonally or parallel to the longitudinal edges 101a, 101b.

The structure of the aforementioned packing element 100 will now be described on the basis of three groups of strips 102a, 102b, 102c, chosen from among all the groups of strips 102 contained in the packing element 100, the three groups of strips forming a segment $100^1$ of the packing element 100. Because the formation of the other segments of the packing element 100, as well as their groups of strips 102, is immediately obvious to the expert in the field from the structure of the groups of strips 102a, 102b and 102c containing the strips 102a–102f, such other segments need not be described here.

This three-group structure of the segment $100^1$ of the packing element 100 is not, however, the only one that is conceivable. Instead, it is possible, as a function of the width of the packing element 100 and also of the width of the individual strips 103a–103f, to provide fewer, or more, than three such groups of strips 102a–102c, each having at least one strip 103a–103f. In the minimum case, the packing element consists of just two groups of strips, e.g., the groups of strips 102a and 102b, each containing just one single strip, e.g., the strips 103a and 103c.

It is important in this connection that the strips 103, (103a–103f) of the packing element 100, which are separated from each other by slits 110 forming dividing lines between the waves, should have a half-wave-shaped or wave-shaped structure. This has the advantage that it permits a packing with a particularly open structure to be formed, thus resulting in a low drop in pressure in a column or in a tower using the described packing elements 100. The exchange surfaces 104 of the packing element 100 are formed by the surfaces of half-wave-shaped or wave-shaped strips 103a–103f. In FIG. 1, the aforementioned half-wave-shaped or wave-shaped configuration of the strips 103a–103f of the groups of strips 102a–102c has been depicted by using shading to indicate the curvature of upper half-waves $103a^1$–$103f^1$, forming the peaks of the waves, while lower half-waves 103a"–103f", forming the valleys of the waves, are shown as unshaded areas. The demarcation between the upper half-waves and lower half-waves $103a^1$–$103f^1$ and 103a"–103f", respectively, is represented in FIG. 1 by the dashed lines 111 and 111a, dashed line 111b marking the turning points.

According to a further embodiment, a first periodic length $1_1$ of the strips 103c, 103d, 103f forming the first group of strips 102a, and the second or third periodic length $1_2$ or $1_3$ of the strips, respectively, 103c, 103d or 103e, 103f of the second or third group of strips 102b or 102c, is selected as follows. The first periodic length $1_1$ of the strip 103b of the first group of strips 102a of the segment $100^1$ of the packing element 100, which strip 103b is adjacent to the second group of strips 102b, and the second periodic length $1_2$ of strip 103c of the second group of strips 102b, which strip 103c is adjacent to the group of strips 102a, are matched to each other in such a way that the two adjoining strips 102b, 102c are in contact with each other at at least one point, so that it is possible for liquid to pass from one of the strips 103b, 103c to the other. Correspondingly, the third periodic length $1_3$ of the strip 103e of the third group of strips 102c, which strip 103e is adjacent to the second group of strips 102b, and the second periodic length $1_2$ of the strip 103d of the second group of strips 102b, which strip 103d is adjacent to the third group of strips 102c, are matched to each other in such a way that the two adjoining strips 102d, 103e are also in contact with one another at at least one point, such that liquid can also pass from one of the strips 103d, 103e, to the other.

In the example shown here, the first periodic length $1_1$, of the strips 103a, 103b forming the first group of strips 102a is equal to the second periodic length $1_2$ of the strips 103c and 103d forming the second group of strips 102b. Similarly, the third periodic length $1_3$ of the strips 103e, 103f forming the third group of strips 102c is equal to the second periodic length $1_2$ of the strips 103c, 103d of the second group of strips 102b, and is thus equal to the first periodic length $1_1$, of the strips 103a, 103b of the first group of strips 102a. However, it is also possible, for example, for the second periodic length $1_2$ of the strips 103c, 103d of the second group of strips 102b to be equal to half the first periodic length $1_1$ of the strips 103a, 103b or 103e–103f of the first or second group of strips 102a or 102c, respectively. Generalizing this embodiment of the invention, it should be added that the second periodic length $1_2$ of the strips 103c, 103d of the second group of strips 102b, which strips are adjacent to the first group of strips 102a, is preferably correlated with the first periodic length $1_1$ of this first group of strips 102a according to the expression $1_2=1_1/n$, where n=1, 2 . . . , i.e., the first periodic length $1_1$ is a multiple of the second periodic length $1_2$.

It is preferred that the first periodic length $1_1$ should be an even numbered multiple of the second periodic length $1_2$. Because of this preferred relationship of the periodic lengths $1_1$ and $1_2$, all the strips 103a–103f advantageously possess a common minimum amplitude at regular intervals, so that all the strips 103a–103f of the groups of strips 102a–102c form a continuous connection 105 which, within the described segment $100_1$ of the packing element 100, extends from the lower longitudinal edge 101a shown in FIGS. 1 and 4 to the upper longitudinal edge 101b shown only in FIG. 1. As a result, advantageously, the liquid present on the exchange surfaces 104 can distribute itself via the connections 105 over the entire segment 100' of the packing element 100 and over the other segments of the packing element 100, and thus substantially over the entire packing element 100.

In order further to reinforce this effect, provision can be made (not shown in the Figures) for the connections 105 in the packing element 100 to be broader in shape. This may be done by adding a web element, (not further depicted here,) to the strips 103a–103f in this area to broaden the continuous connections 105.

The above-described configuration of the packing element 100, with continuous connections 105, is preferred, but not absolutely essential. Instead, in order to achieve the transfer of liquid, it is sufficient if adjacent strips 103a–103f are in contact with each other in pairs at at least one point so that, for example by capillary action, liquid may be transferred from one strip 103a–103f to another. As regards the gas permeability of the packing element 100 for systematically constructed packings, it is advantageous for adjacent strips 103a and 103b, 103b and 103c, 103c and 103d, etc. to be arranged in opposite phase to each other. This embodiment can best be seen in FIG. 2 which shows that, in the embodiment described, the upper half-waves $103a^1$ of the first wave-shaped strip 103a are arranged alternatingly in respect to the upper half-waves $103b^1$ of the second wave-shaped strip 103b. Correspondingly, the lower half-waves 103a" of the wave-shaped strip 103a are arranged alternatingly in respect to the upper half-waves 103b" of the second wave-shaped strip 103b.

It is naturally also conceivable that this opposite-phase arrangement be provided just for a defined number of upper half-waves or lower half-waves. The expert in the field can see that, depending on the specific intended application for the packing element 100 in systematically constructed packings, a plurality of arrangements is possible for the half-waves $103a^1$, 103a", $103b^1$, 103b" of the wave-shaped strips 103a, 103b of the first group of strips 102a.

The relative spatial arrangement of the half-waves $103c^1$, 103c" and $103d^1$, 103d" of the two wave-shaped strips 103c and 103d in the second group of strips 102b, as well as of the half-waves $103e^1$, 103e", $103f^1$, 103f" of the strips 103e, 103f in the third group of strips 102c of the packing element 100, is preferably the same as that shown for the strips 103a, 103b of the first group of strips 102a. However, it is preferred that the orientation of the strips 103c or 103e adjoining the respective preceding group of strips 102a or 102b be selected in such a way that the half-waves are alternatingly arranged, i.e., in opposite phase, with respect to those of the corresponding strips 103b or 103d in the preceding group of strips 102a or 102b.

Of course, it is also possible for at least one segment $100^1$ of the packing element 100, or for the packing element 100 as a whole, to consist substantially of strips 103, (103a–103f) possessing in each case only upper half-waves or lower half-waves $103a^1$–$103f^1$,103a"–103f". It is also possible for one or more strips 103, (103a–103f) of the packing element 100 to be designed in such a way that one or more flat strip elements are arranged between two adjacent half-waves $103a^1$–$103f^1$ or 103a"–103f". Such arrangements of the strips 103, (103a–103f) offer the advantage that a packing element 100 having such a design is particularly simple to manufacture.

Figure 2:
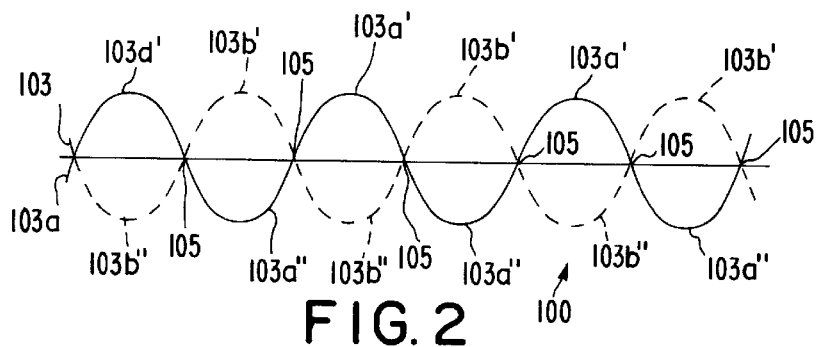
FIG. 2 is a view of the embodiment shown in FIG. 1, seen from the direction of the arrow II.

(ii) Description of FIG. 2

As can best be seen from FIG. 2, the individual strips 103a–103g are substantially sinusoidal in shape. This has the advantage that droplets of liquid which are present on the exchange surfaces 104 of the strips 103a–103f can move along these surfaces without immediately dripping off. However, instead of the sinusoidal configuration of the half-wave-shaped or wave-shaped strips 103a–103f, it is also possible to provide such half-wave shape or wave shape as other shapes, e.g., triangular, sawtooth or stepped shapes for the half-waves $103a^1$–$103f^1$.

Figure 3:
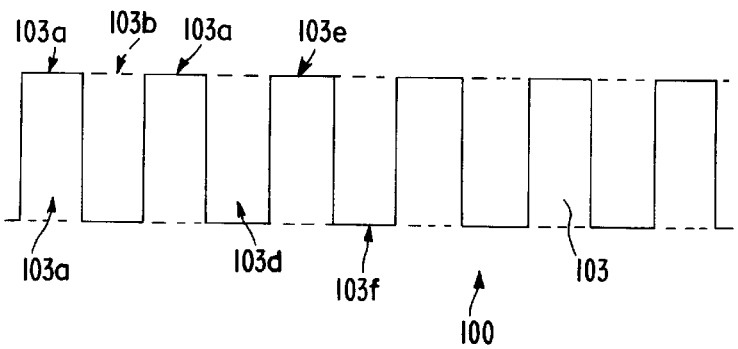
FIG. 3 is a view of the embodiment shown in FIG. 1, seen from the direction of the arrow III.

(iii) Description of FIG. 3

In FIG. 3, which shows a view from the direction of the arrow III of the packing element 100, the sequence of the individual strips 103a–103f of the group of strips 102a–102c can be seen. If the foregoing description is borne in mind, this Figure does not require any further explanation.

(iv) Description of FIG. 4

FIG. 4 depicts the path of several half-waves $103a^1$–$103f^1$ of the strips 103a–103f of the groups of strips 102a–102c of the packing element 100. The half-waves are located in the area of the turning point lines 111a, 111b shown in FIG. 1. It can be seen from FIG. 4 that, starting from the edge 101a, which has the form of a web 105, of the packing element 100, the lower half-waves 103a", 103c" and 103e", at first extend downwards to form a valley in the undulation of the strips 103a, 103c and 103e. The aforementioned lower half-waves 103a", 103c" and 103e" of the strips 103a, 103c and 103e then merge, in the area of the second turning point line 101b, into the upper half-waves $103a^1$, $103c^1$ and $103e^1$, and subsequently merge into the next lower half-waves 103a", 103c" and 103e", which are no longer shown in FIG. 4.

As can be seen from the above description, FIG. 4 depicts every second strip 103a–103f in the groups of strips 102–102c. This has been done in order to provide a clearer depiction of the spatial path followed by the strips 103, (103c–103e) which are shown. From the above description and from the described drawings, the expert in the field can see clearly that, as depicted in FIG. 1, the strips 103b, 103d and 103f positioned between the strips 103a, 103c and 103e of the group of strips 102a–102c run in opposite phase to or, as described, are arranged in phase with the strips 103a, 103c and 103e.

In addition, the described packing element 100 has the advantage that it is particularly easy to manufacture from sheet metal by, in a first step, making cuts in the sheet metal. These cuts separate the individual strips 103, (103a–103f) of the packing element 100, and these individual strips 103a–103f of the packing element 100 are held together by the longitudinal edges 101a, 101b. In a second manufacturing operation, the now separated metal strips 103, (103a–103f) in the sheet metal are shaped to produce the wave structure of the strips 103, (103a–103g), and the strips 103, (103a–103f), are possibly mechanically joined at their points of contact.

Next, the longitudinal edges 101, 101b are also undulatingly bent in order to give the packing element its above-described wave-shaped structure.

Optionally, at least some of the strips 103, (103a–103f) of the packing element 100, may be mechanically separated from the longitudinal edges 101a, 101b, which are also designated 106, of the packing element 100 in FIG. 1.

The free ends of these strips 103, (103a–103f) created by this mechanical separation of the strips 103a, 103–103f of the packing element 100 offer the advantage that the packing element 100 possesses an unbroken boundary element 106. Even though the ends of some strips 103, (103a–103f) are free, none of the free ends of such strips 103, (103a–103f) project above or beyond the boundary element 106. This is especially important for the installation and assembly of the packing element 100.

In order to provide the packing element 100 with sufficient stability, and to permit better passage of the liquid from one adjacent strip to another, the individual strips 103a–103f of the groups of strips 102a–102c of the packing element 100 are advantageously mechanically joined at their points of contact. However, it must be stressed that this mechanical connection is not absolutely necessary to permit the passage of liquid between two adjacent strips 103a–103g because, as already mentioned, it is also possible to arrange two adjacent strips 103a–103f at such a spacing from each other that the passage of liquid can be achieved by a capillary effect.

In order further to increase the mechanical stability of the described packing element, it is also advantageously possible to provide at least one stiffening groove (not shown) in at least one of the strips 103a–103f.

It is also possible that the packing element 100 for use in a systematically constructed packing, not be made of metal but be made of ceramic or synthetic plastic material. In the case of synthetic plastic material, the packing element can advantageously be manufactured by injection moulding.

It must also be mentioned that, by appropriately lining up a plurality of packing elements 100, as well as by joining them mechanically, a systematically constructed packing is advantageously created for columns or towers. That packing has the advantage that it causes only a low drop in pressure in the gas flow through these columns or towers and also permits a substantially uniform distribution of the liquid introduced into the column or tower over the individual packing elements 100. In addition, the packing elements 100 can be manufactured in a particularly advantageous and therefore cost-effective manner.

It should also be mentioned that, among the many possible embodiments of the packing element 100, the embodiment depicted in the Figures in which the strips 103a–103f of the groups of strips 102a–102c each have the same periodic length is preferred, because, due to the resulting regular structure of the described packing element 100 which can be achieved in this way, a particularly low loss of pressure is obtained for the gas flowing through the column or the tower.

In this case, in particular, it is advantageous if the passage of liquid preferably to be achieved from one adjacent strip 103, 103a–103f to another in packing element 100 be accomplished by the fact that adjoining strips are in appropriate contact with one another at least one point, and by choosing an appropriate shape or amplitude for the half-wave-shaped or wave-shaped strips 103, 103a–103f.

CONCLUSION

Generalizing, it can be stated, therefore, that in the described packing element 100 for systematically constructed packings, the periodic length and/or the form of the half-wave-shaped or wave-shaped strips 103, (103a–103f), are matched to each other in such a way that optimum distribution is achieved of the gas and/or liquid flow within the packing.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A packing element for structured packing for use in at least one of a mass and heat transfer column and tower through which at least one fluid flows, said packing element having a length-wise and a width-wise direction, a plurality of one of at least one of a half-waved shaped strips and wave-shaped strips each having a respective length extending generally along the width-wise direction of said packing element, each of said strips having top and bottom surfaces and interconnecting, opposed side surfaces, the top and bottom surfaces of each strip defining exchange surfaces for the at least one fluid, the strips of the packing element being arranged side-by-side in the length-wise direction of the packing element, said strips of the packing element being divided into at least two groups, said first and second groups respectively comprised of at least one strip, all of the strips of the first group having a first periodic length and all of the strips of the second group having a second periodic length, said first and second groups each having a respective selected strip, which said selected strips are arranged side-by-side, adjacent to each other, wherein the first periodic lengths of the strips of the first group and the second periodic lengths of the strips of the second group are matched to each other in a manner such that the side surfaces of the selected adjacent strips are at least one of physically and capillarilly contacting each other at at least one point but not collectively at a number of points so as to continuously join said adjacent strips along their respective lengths, wherein fluid may travel from the selected strip of said one group to the adjacent selected strip of a next group by one of direct flow and capillary action to enhance the distribution of the fluid over the strips of the packing element.

2. The packing element of claim 1 wherein all of said individual strips have a respective pair of ends, each of said strip ends forming a respective outer side of said packing element in said lengthwise direction, wherein at least one side of said packing element includes a boundary element joining at least some of said strips of a group of strips.

3. The packing element of claim 2 wherein both outer sides of said packing element include respective boundary elements joining at least some of said strips of a group of strips on each respective side.

4. The packing element of claim 3 wherein both outer sides of said packing element include respective boundary elements joining all of said strips of group of strips.

5. The packing element according to claim 1, wherein all of said strips in at least one group of strips of the packing element have the same periodic length and wherein said first periodic length is equal to said second periodic length.

6. The packing element according to claim 1, wherein said packing element includes a third group of strips, said third group containing at least one of a half-wave shaped strips and wave-shaped strips each having a respective length extending generally along the widthwise direction of said packing element, each of said strips in said third group having top and bottom surfaces and interconnecting, opposed side surfaces, the top and bottom surfaces defining exchange surfaces for the at least one fluid, said third group of strips arranged side-by-side in the lengthwise direction, all of said strips in said third group having a third periodic length said third group having a selected third strip arranged side-by side with said selected strip in said second group, wherein the second periodic length of the strips of the second group and the third periodic length are matched to each other in a manner such that the side surfaces of the selected adjacent strips are at least one of physically and capillarily contacting each other at at least one point but not collectively at a number of points so as to continuously join said acjacent strips along their respective lengths, wherein fluid may travel from the selected strip of said second group to said selected strip of said third group by one of direct flow and capillary action.

7. The packing element according to claim 1, wherein all of said strips in at least one group of strips of said packing element have the same periodic length and wherein said first periodic length is equal to said second periodic length and is also equal to said third periodic length.

8. The packing element according to claim 6, wherein the first periodic length of at least one strip in said first group of strips is equal to the third periodic length of a strip in said third group of strips.

9. The packing element according to claim 1, wherein the first periodic length of at least one strip in said first group of strips is equal to the second periodic length of a strip in said second group of strips.

10. The packing element according to claim 1, wherein the second periodic length of said second group of strips is one of smaller than and equal to, the first periodic length of the strips of said first group of strips.

11. The packing element according to claim 10, wherein the first periodic length of said first group of strips is a multiple of the second periodic length of the strips of said second group of strips.

12. The packing element according to claim 11, wherein said multiple is an even-numbered multiple.

13. The packing element according to claim 1, wherein two adjacent strips of said packing element are mechanically connected at their point of contact.

14. The packing element according to claim 13, wherein at least two adjacent individual strips of said first and second group of strips of the packing element form at least one continuous connection for the liquid to be distributed.

15. The packing element according to claim 14, wherein at least one of said continuous connections is broadened by means of a web element.

16. The packing element according to claim 14, wherein at least one of said continuous connections extends from a first outer side of said packing element to a second outer side of said packing element.

17. The packing element according to claim 1, wherein at least one half-wave configuration of a strip is arranged in opposite phase to a half-wave of an adjacent strip.

18. The packing element according to claim 1, wherein at least two strips of at least one group of strips of said packing element are each configured with half-waved shape arranged in opposite phase to each other.

19. The packing element according to claim 1, wherein at least two adjacent strips in two adjacent groups of strips are arranged in opposite phase.

20. The packing element according to claim 1, wherein at least one half-wave of a strip is arranged in opposite phase to a half-wave of an adjacent strip.

21. The packing element according to claim 20, wherein one half-waved shaped strip has an upper and lower half and an adjacent half-waved shaped strip has an upper and lower half, one of the upper and lower halves of the first strip arranged in opposite phase to one of the lower and upper halves of the adjoining strip.

22. The packing element according to claim 1, wherein at least one group of strips of the packing element is arranged at an oblique angle to the outer sides of the packing element.

23. The packing element according to claim 22, wherein said oblique angle is about 45°.

24. The packing element according to claim 2, wherein at least two adjacent strips of said packing element have one of the same half-wave and full wave shaped configuration.

25. The packing element according to claim 1, wherein at least two adjacent strips of the packing element have a different configurations from the other.

26. The packing element according to claim 1, wherein the half-waved and full-waved configurations of at least two adjacent strips in said packing element have the same amplitude.

27. The packing element according to claim 1, wherein the half-waved and full-waved configurations of at least two adjacent strips in said packing element have different amplitudes.

28. The packing element according to claim 1, wherein said packing element has a sine wave configuration along its widthwise direction.

29. The packing element according to claim 1, wherein said packing element is manufactured from one of a metal, ceramic and synthetic plastic material.

30. The packing element according to claim 29, wherein said packing, element is manufactured from sheet metal.

* * * * *